US008556706B2

(12) United States Patent
Barney et al.

(10) Patent No.: US 8,556,706 B2
(45) Date of Patent: Oct. 15, 2013

(54) VIDEO POKER WAGERING GAME HAVING MULTIPLE PAY TABLES

(75) Inventors: Chris Barney, Las Vegas, NV (US); Darvell Hunt, Saratoga Springs, UT (US); Brian Manning, Las Vegas, NV (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 1269 days.

(21) Appl. No.: 12/121,309

(22) Filed: May 15, 2008

(65) Prior Publication Data

US 2009/0286583 A1 Nov. 19, 2009

(51) Int. Cl.

| | |
|---|---|
| ***A63F 9/24*** | (2006.01) |
| ***A63F 13/00*** | (2006.01) |
| ***G06F 17/00*** | (2006.01) |

(52) U.S. Cl.

USPC ........ 463/23; 463/9; 463/10; 463/11; 463/13; 463/25; 463/29

(58) Field of Classification Search

USPC ................................ 463/25, 9–11, 13, 23, 29

See application file for complete search history.

(56) References Cited

U.S. PATENT DOCUMENTS

| | | | | |
|---|---|---|---|---|
| 5,941,770 | A * | 8/1999 | Miers et al. | 463/13 |
| 2005/0130729 | A1 * | 6/2005 | Baerlocher et al. | 463/16 |
| 2008/0214259 | A1 * | 9/2008 | Novellie et al. | 463/13 |
| 2008/0252011 | A1 * | 10/2008 | Bickley et al. | 273/292 |

OTHER PUBLICATIONS

Chessmaster 9000, 2002, Ubi Soft Entertainment.*

* cited by examiner

*Primary Examiner* — Werner Garner

(74) *Attorney, Agent, or Firm* — Nixon Peabody LLP

(57) ABSTRACT

A gaming system has at least one display adapted to display a wagering game including the display of a player's hand and a computer opponent's hand in a card-based wagering game, a player input device, and a controller. The controller is operative to award to a player an award from a pay table for a player's hand having a winning combination associated with the pay table, regardless of a rank of the computer's opponent hand relative to the player's hand.

20 Claims, 8 Drawing Sheets

VIDEO POKER WAGERING GAME HAVING MULTIPLE PAY TABLES

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines configured to play wagering games and wagering games associated with gaming machines, such as slot machines or other electronic or electromechanical device configured to play wagering games.

BACKGROUND OF THE INVENTION

Casinos and other gaming establishments often include both gaming machines, for example, slot machines providing slot games and gaming tables providing table games such as craps or roulette. As a result, many game play options are available to patrons of the gaming establishments. Interestingly, whether due to human nature, risk tolerance, economics, skills, game familiarity, etc., it has been observed that some patrons consistently prefer gaming machine play while others prefer table game play. Shrewd gaming establishment operators consequently strive to offer a proper balance between entertaining and exciting gaming machines that encourage frequent and extended play, and fast paced gaming tables offering games such as blackjack, roulette, craps, keno, baccarat, etc., where wagering amounts per game are often substantial.

Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Operators consequently strive to employ the most entertaining and exciting machines, features, and enhancements available because such machines attract frequent play and hence increase profitability to the operator. The use of video with gaming machines has significantly increased the entertainment value and thus the popularity of gaming machines for games including, but not limited to, video slots, video poker, video blackjack, video keno, video bingo, video pachinko, video lottery, etc.

SUMMARY OF THE INVENTION

In one embodiment, a gaming system includes at least one display adapted to display a wagering game including the display of a player's hand and a computer opponent's hand in a card-based wagering game, a player input device, and a controller. The controller is operative to award to a player an award from a pay table for a player's hand having a winning combination associated with the pay table, regardless of a rank of the computer's opponent hand relative to the player's hand.

In another embodiment, a gaming system includes a display, an input device, and a controller operative to, upon execution of a wagering game instruction set, cause the conduct of a card-based wagering game, inclusive of the generation of a player's initial hand and a computer opponent's initial hand, the display of the player's initial hand and the computer opponent's initial hand, the generation of any replacement cards requested by the player or the computer to form a final player's hand and a final computer opponent's hand, and the determination of an award associated with the final player's hand, the determination of an award comprising comparing a final player's hand comprising a winning combination to a first pay table if the final player's hand wins over a final computer opponent's hand and comparing a final player's hand comprising a winning combination to a second pay table if the final player's hand loses to a final computer opponent's hand.

In a further embodiment, a gaming system includes a means for displaying a wagering game, a means for accepting a player input, a means for randomly determining a player outcome and a computer outcome in the wagering game, and a means for awarding a first award to a player in the wagering game if the player achieves a winning outcome having a lesser rank in a pay table hierarchy than the computer outcome and for awarding a second award to a player in the wagering game if the player achieves a winning outcome having a greater rank in the pay table hierarchy than the computer outcome, the second award being greater than the first award.

In another embodiment, a method for conducting a wagering game includes the acts of receiving a wager from a player and conducting a wagering game. The wagering game includes the acts of dealing to each of the player and a player's opponent a hand comprising a plurality of randomly selected cards, conducting a turn for the player and for the player's opponent relating to the plurality of randomly selected cards, comparing a player's hand and a player's opponent's hand to a predetermined plurality of winning hands to determine if at least one of the player's hand or the player's opponent's hand is a winning hand. The method also includes the acts of determining, if the player's hand is a winning hand, whether the player's opponent's hand is a winning hand superior to the player's hand, and awarding a first award to the player for a player's winning hand inferior to a player's opponent's winning hand and awarding a second award, greater than the first award, to the player for a player's winning hand superior to the player's opponent's winning hand.

In yet another embodiment, a method for conducting a wagering game includes conducting a card-based wagering game pitting a randomly-generated player hand against a randomly-generated computer hand, determining if a player's winning hand is superior to the computer hand, awarding a base award to a player if the player's winning hand is inferior to the computer hand, and awarding an enhanced award, greater in value than the base award, if the player's winning hand is superior to the computer hand.

In still another embodiment, a computer readable medium bearing instructions is provided and is configured to cause one or more processors, upon execution of the instructions, to perform acts comprising conducting a card-based wagering game, inclusive of the generation of a player's initial hand and a computer opponent's initial hand, generating any replacement cards requested by the player or the computer to form a final player's hand and a final computer opponent's hand, determining if the final player's hand comprises a winning outcome, as compared to a plurality of predefined winning outcomes, determining if the final player's hand is superior in rank to the final computer opponent's hand, and awarding to the player a base award if the final player's hand is not superior in rank to the final computer opponent's hand or an enhanced award an enhanced award if the final player's hand is superior in rank to the final computer opponent's hand.

In still another embodiment, a method for conducting a wagering game, comprises receiving a wager from a player, conducting a wagering game between a player and an opponent, and awarding a first award to the player if the player's hand comprises a winning hand that is inferior to the opponent's hand or awarding a second award, greater than the first award, to the player if the player's hand comprises a winning hand that is superior to the opponent's hand.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
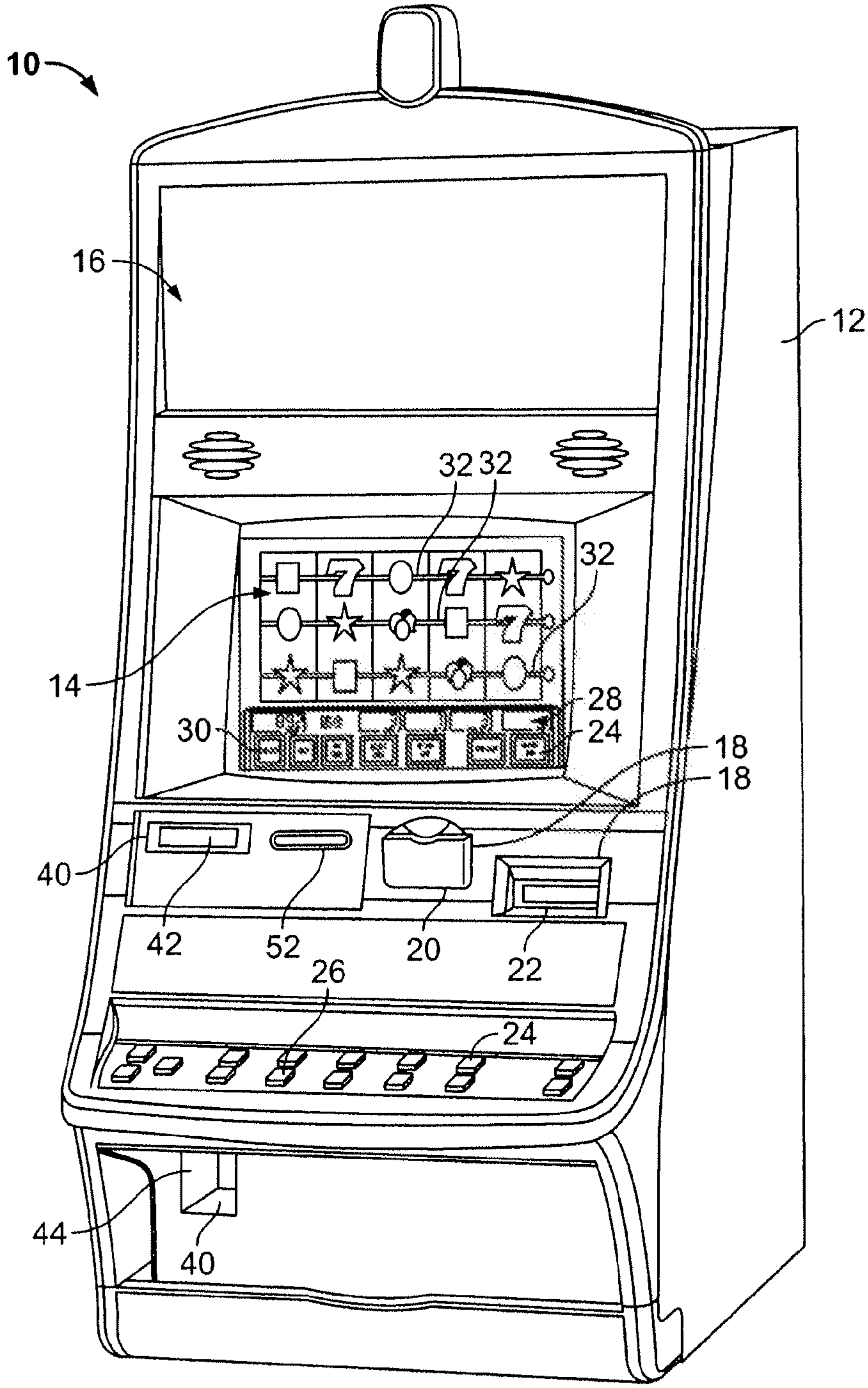
FIG. 1*a* is a perspective view of a free standing gaming machine.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
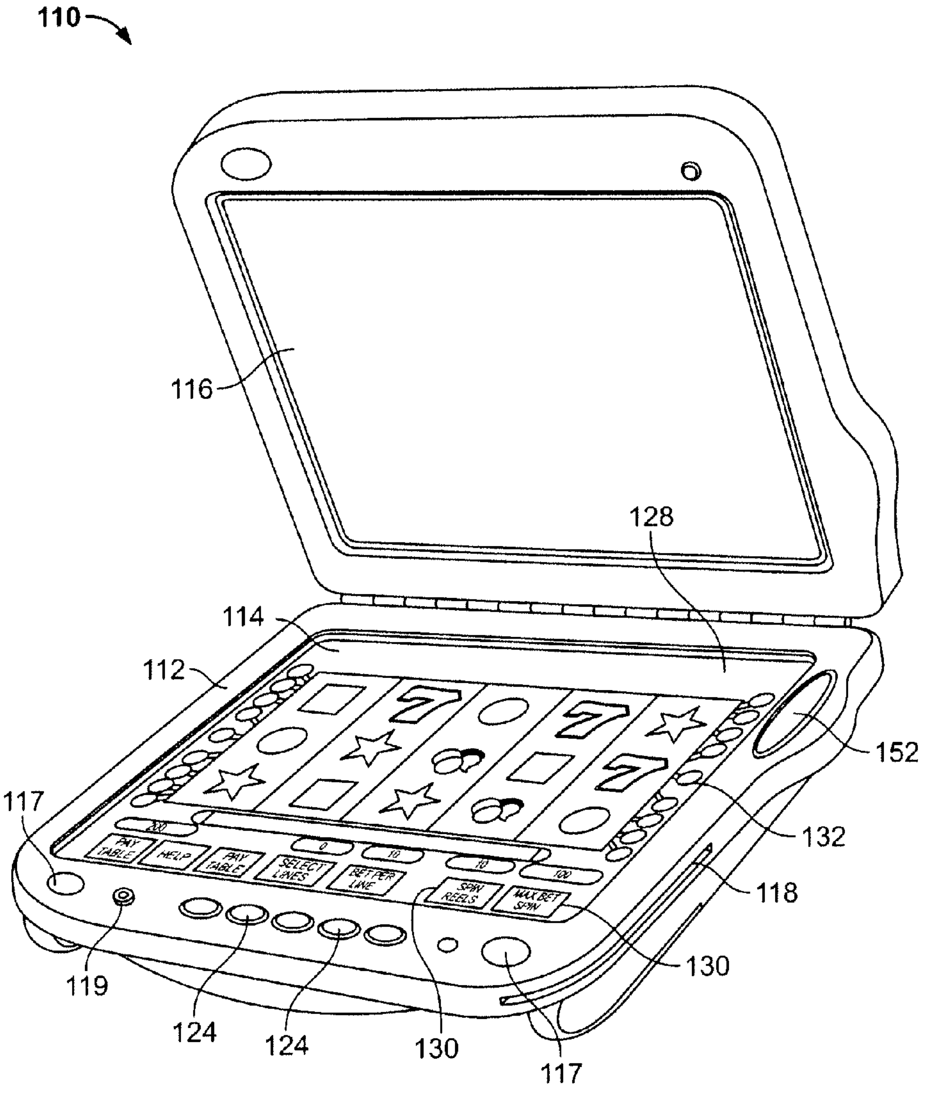
FIG. 1*b* is a perspective view of a handheld gaming machine.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
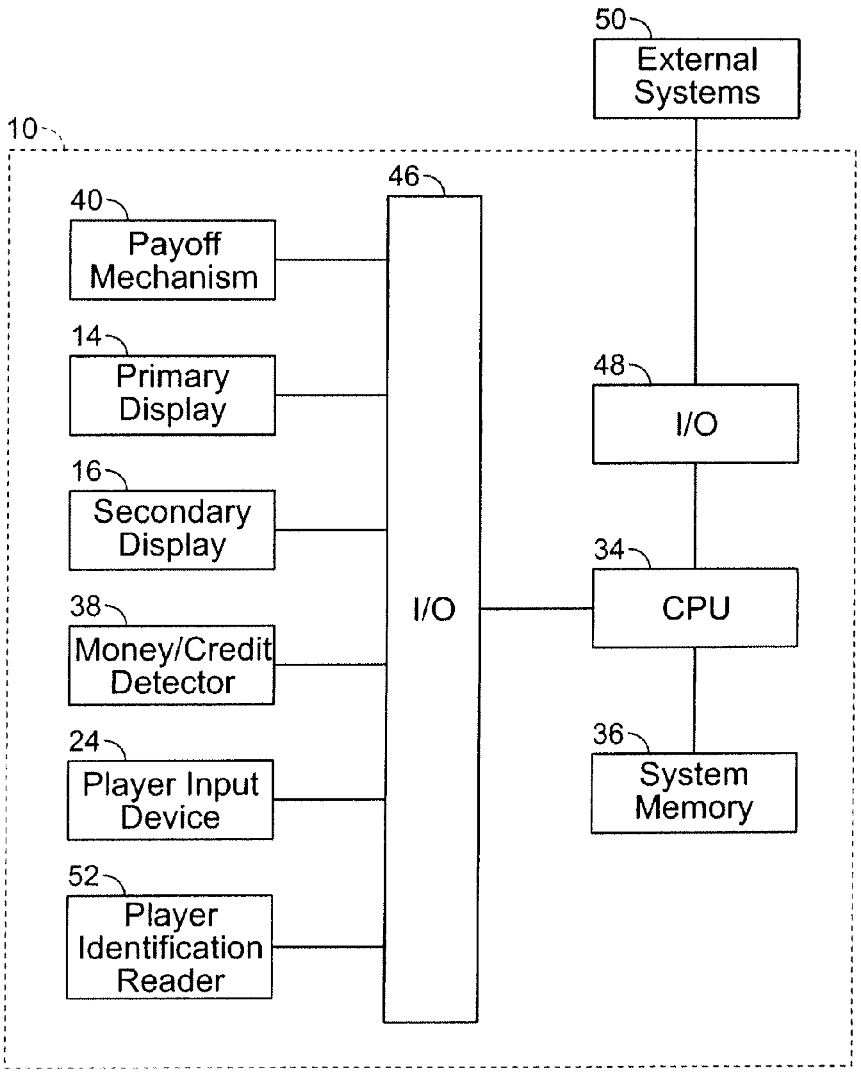
FIG. 2 is a block diagram of a control system suitable for operating the gaming machines of FIGS. 1*a* and 1*b;*
Figure 3A:
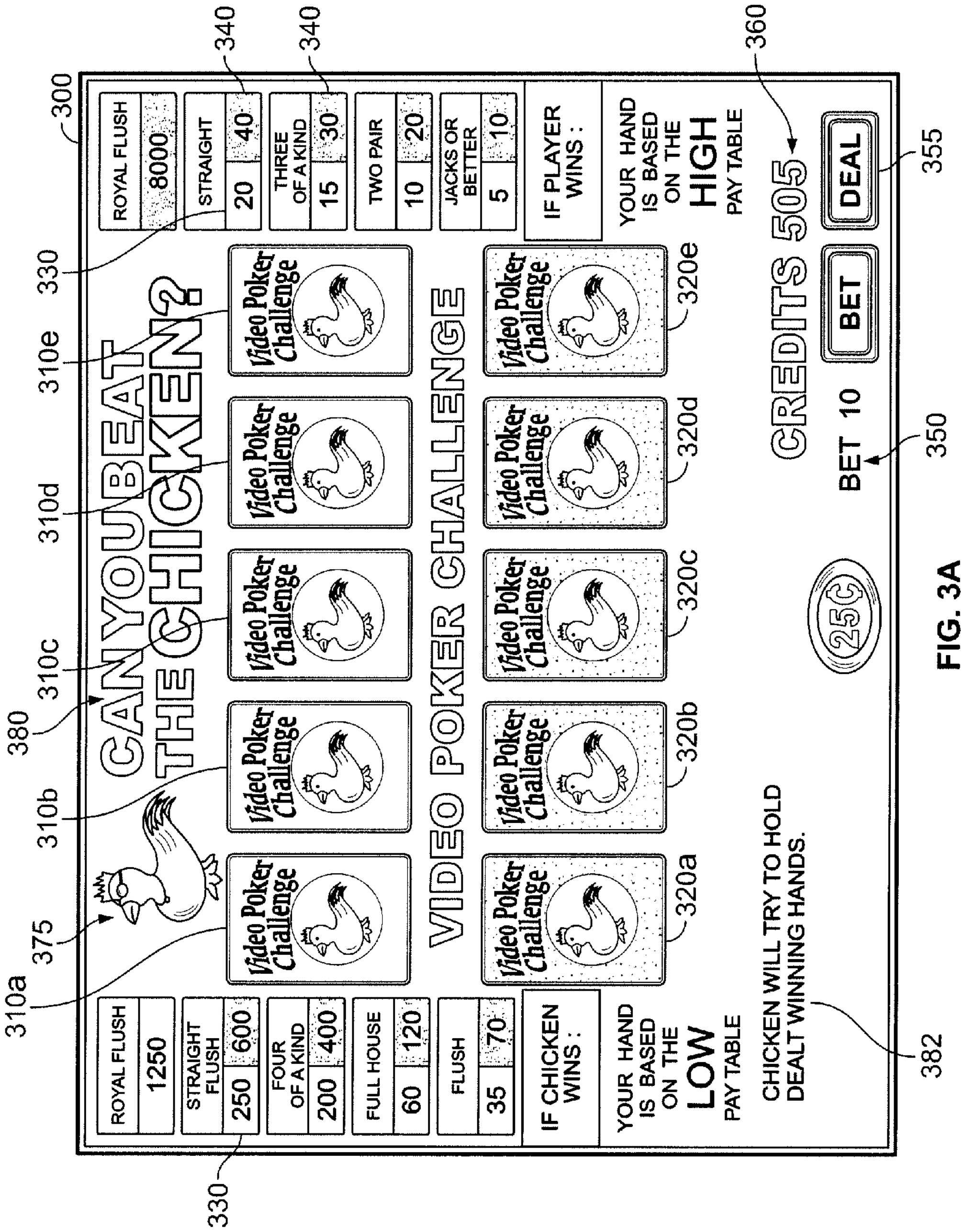
FIGS. 3(*a*)-3(*d*) show representative displays of a wagering game in accord with at least some aspects of an embodiment of the present concepts.
Figure 3B:
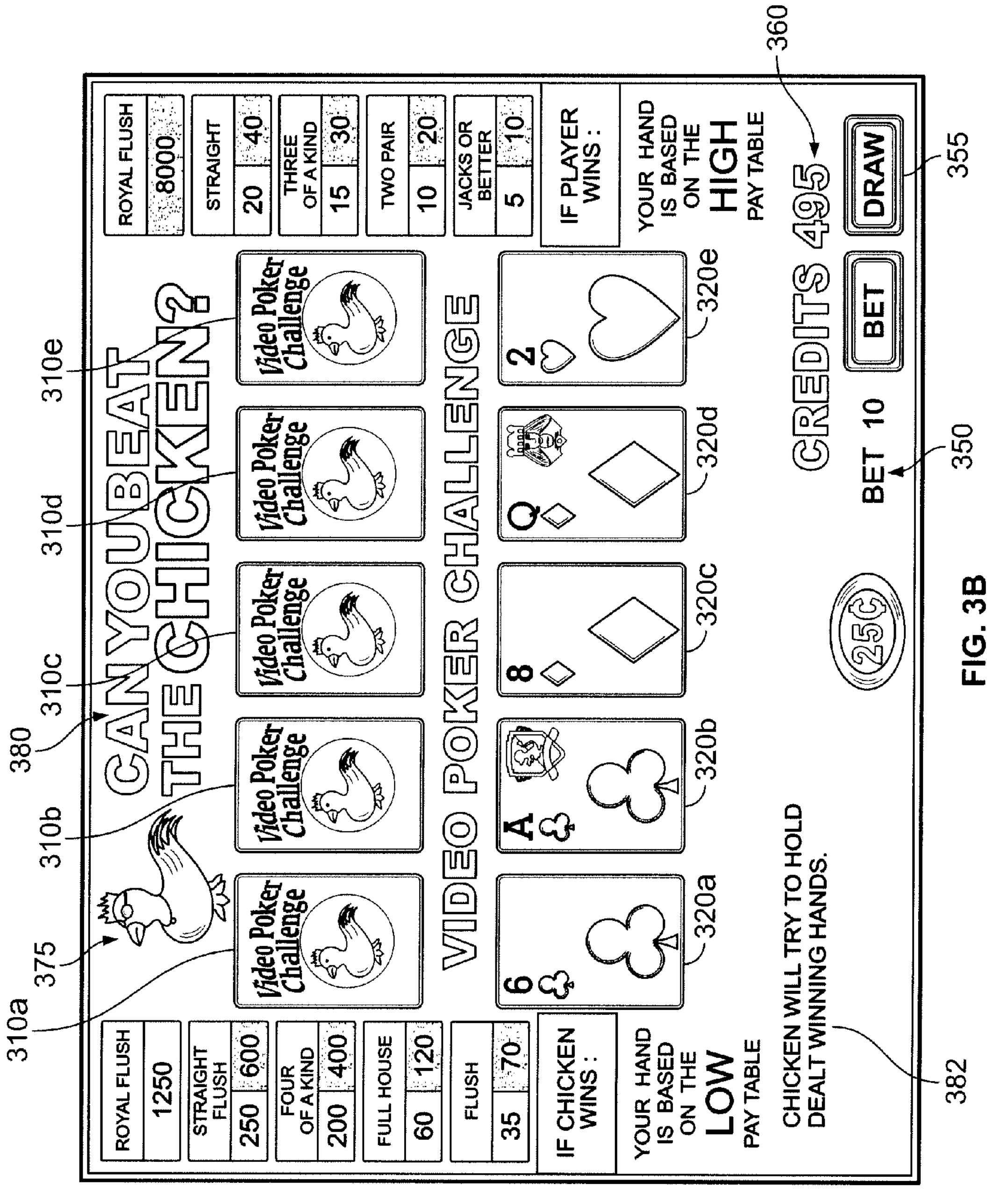
Figure 3C:
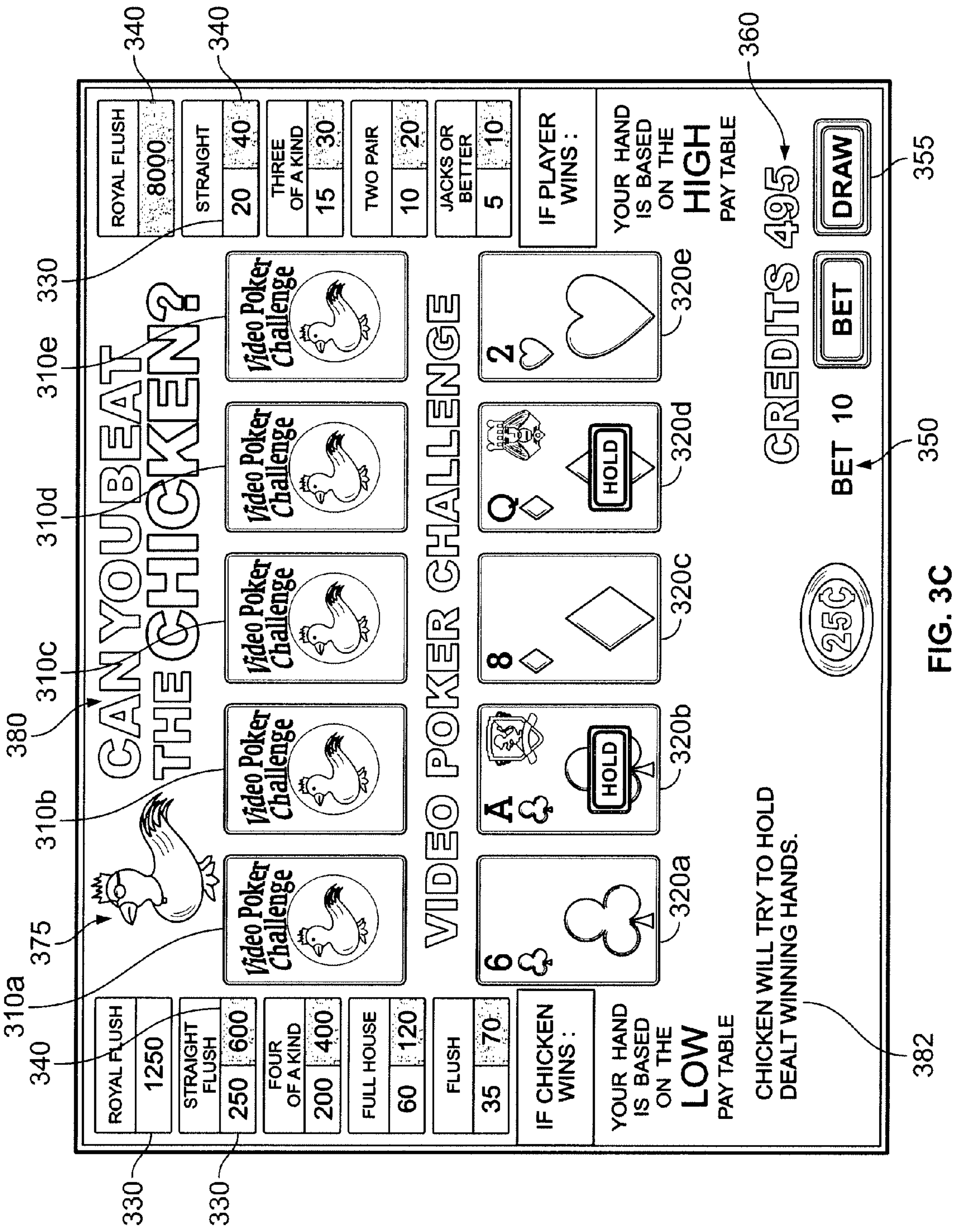
Figure 3D:
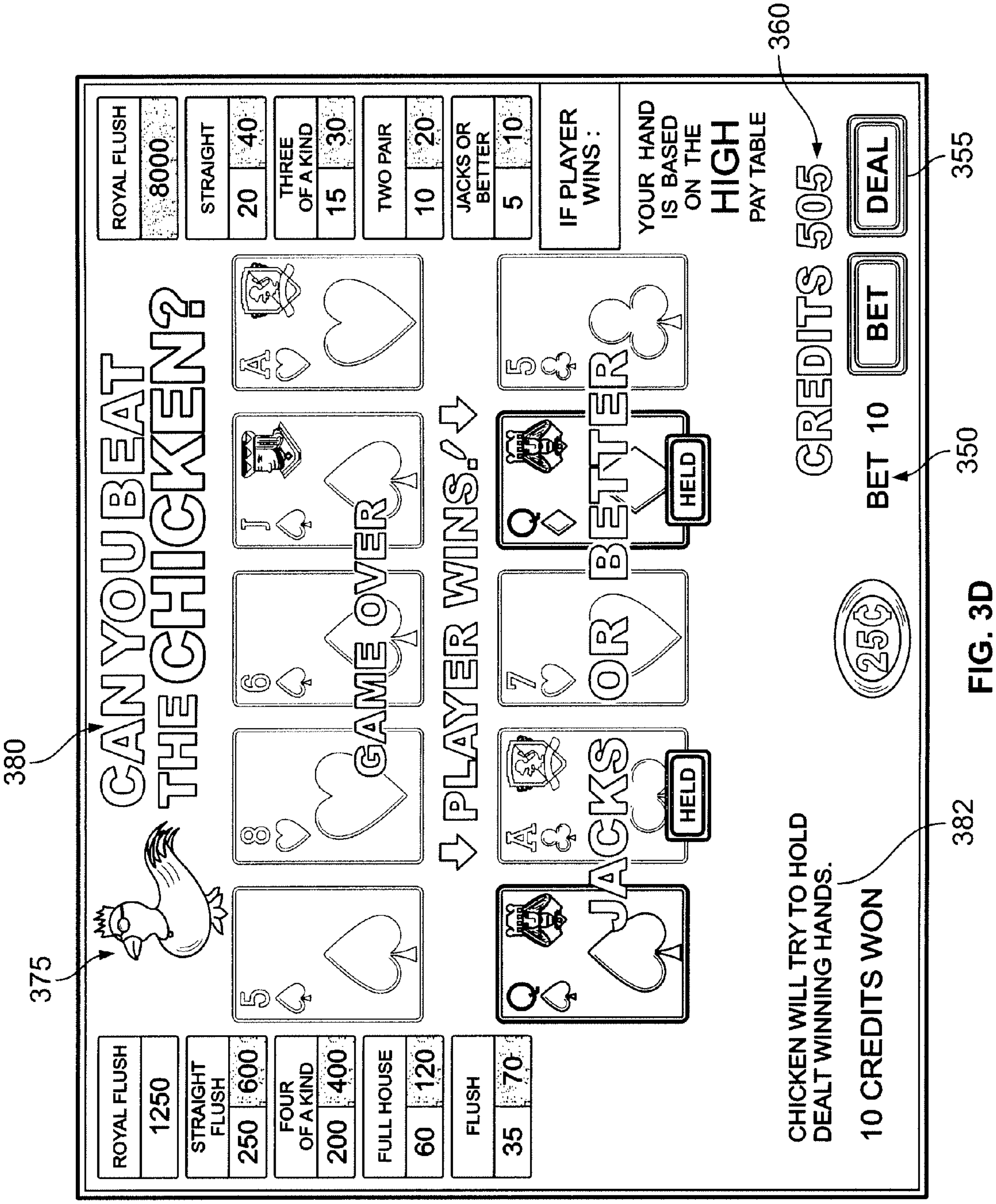

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

FIGS. 3(*a*)-3(*d*) depict an example of at least some aspects of the present concepts wherein there is displayed a card-based wagering game in which a plurality of symbol-bearing objects, cards 310*a-e* and 320*a-e*, as shown, indicative of a randomly selected wagering game outcome are displayed on a display 300. The cards 310*a-e* represent, in the illustrated embodiment, cards dealt to a computer and, correspondingly, the cards 320*a-e* represent cards dealt to the player. A controller 34 (see FIG. 2) is operative to award a player a first award from a first pay table 330 if the player loses to the computer and to award a player a second, higher award from a second pay table 340 if the player beats the computer.

FIGS. 3(*a*)-3(*d*) show that, for the first pay table 330, a player is awarded, for a wager of 10 credits, 1250 credits for a Royal Flush, 250 credits for a Straight Flush, 200 for a Four of a Kind, 60 credits for a Full House, 35 credits for a Flush, 20 credits for a Straight, 15 credits for a Three of a Kind, 10 credits for Two Pair, and 5 credits for Jacks or Better. In the second pay table 340, a player is awarded, for a wager of 10 credits, 8000 credits for a Royal Flush, 600 credits for a Straight Flush, 400 for a Four of a Kind, 120 credits for a Full House, 70 credits for a Flush, 40 credits for a Straight, 30 credits for a Three of a Kind, 20 credits for Two Pair, and 10 credits for Jacks or Better. These amounts are merely examples of aspects of disclosed concepts and are in no way to be taken as being limiting in any way. In accord with this dual pay table 330, 340 arrangement, a player losing to the computer and failing to obtain a hand comprising at least Jacks or Better, at least in the illustrated poker variant, will not be awarded an award. Similarly, it is possible that neither the computer nor the player may win if neither achieve a minimum predetermined winning combination (e.g., Jacks or Better).

In the sequence of game play shown by FIGS. 3(*a*)-3(*d*), FIG. 3(*a*) itself shows the player's wager 350 of 10 credits and the initial deal of the computer's randomly selected cards 310*a-e* and the player's randomly selected cards 320*a-e*. The type of random selection or nature of the random number generator (RNG) is not limiting on the present concepts and could include, but is not limited to, any selection or generation currently employed in the wagering game industry, domestically or abroad, within appropriate constraints or computational limits imposed by local authority (e.g., Gaming Control Board), sovereign authority and/or federal gaming authority (e.g., The National Indian Gaming Commission (NIGC)). As but one example, a RNG may, in effect, randomly deal cards from a shoe of one deck of cards. For example, the RNG may output, from a 52 card deck, a first set of five cards 310*a-e* and, responsive to a player's activation of a deal/draw button 355, output the second set of five cards 320*a-e* to the player based on the remaining 47 cards in the deck, with any subsequent discards and draws in the round of play taken place from the remaining 42 cards in the deck.

FIG. 3(*b*) shows an initial deal of five cards 320*a-e* to a player responsive to a player's input of a 10 credit wager and activation of the deal/draw button 355, the five dealt cards 320*a-e* comprising a 6 of clubs, an Ace of Clubs, an eight of diamonds, a Queen of diamonds, and a two of hearts. Further responsive to activation of the deal/draw button 355, the player's credit meter 360 is decremented by the amount of the wager and now shows "495" credits, relative to the "505" credits shown in FIG. 3(*a*).

In FIG. 3(*c*), the player has elected to hold the high cards, the Ace of Clubs (card 320*b*) and the Queen of diamonds (card 320*d*), and discard the rest. At this point, in the illustrated example, the computer still has not been dealt any cards. At this point, in the illustrated example, the computer still has not been dealt any cards.

FIG. 3(*d*) shows a point in game play wherein the player has already been dealt the replacement cards, a Queen of spades, a seven of hearts, and a 5 of clubs to yield a hand with a pair of Queens. Although intermediary screen shots between FIGS. 3(*c*) and 3(*d*) are not shown, the computer was dealt an initial hand of five cards subsequent to completion of the player's hand and the computer elected to discard one or more cards in accord with a predetermined game strategy, a game strategy selected from a plurality of available game strategies, or even a game strategy selected for the computer by the player or directly influenced by the player. Displayed, optionally, on the display is an indication of the strategy employed by the computer. In this example, displayed on the display is a message to the player that the computer will "try to hold dealt winning hands".

In the depicted embodiment, in the event of a tie, the player wins. Alternatively, the computer could be configured to win in the event of a tie. In some aspects, the tie is called at the level of a certain category of the pay tables (e.g., Jacks or Better). Thus, where both the player and the computer obtain hands within a certain category of the pay tables (e.g., Jacks or Better), regardless of the actual rank, a predetermined one of the player or the computer would win. In this aspect, a player's hand of a pair of Jacks could beat the computer's hand of a pair of Aces. In other aspects, ties are not resolved at a pay table category level, but are resolved rather at the hand rank category, examining initially the cards forming a winning hand, including sequence and/or high card(s) where applicable, and optionally involving one or more kicker cards.

The computer hand of cards 310*a-e* represented in FIG. 3(*d*) shows that the computer's final hand, following the discard and deal of replacement cards, consisted of a five of spades, an eight of spades, a six of spades, a Jack of spades, and an Ace of hearts. As shown, the computer discarded all of the initially dealt cards. Accordingly, in FIG. 3(*d*), the player's hand of cards 320*a-e* (i.e., two Queens) wins over the computer's hand 310*a-e* of Ace high. According to the pay table 340, which governs wins by the player over the computer, the player is awarded 10 credits for Jacks or Better. The credit meter 360 is accordingly shown to be incremented up to 505 credits.

In the illustrated example, the player's win is highlighted by text (e.g., "Player Wins!" and an overlay of the description of the winning hand over the cards 320*a-e*), arrows, contrast in shading or colors, or the like.

Figure 4:
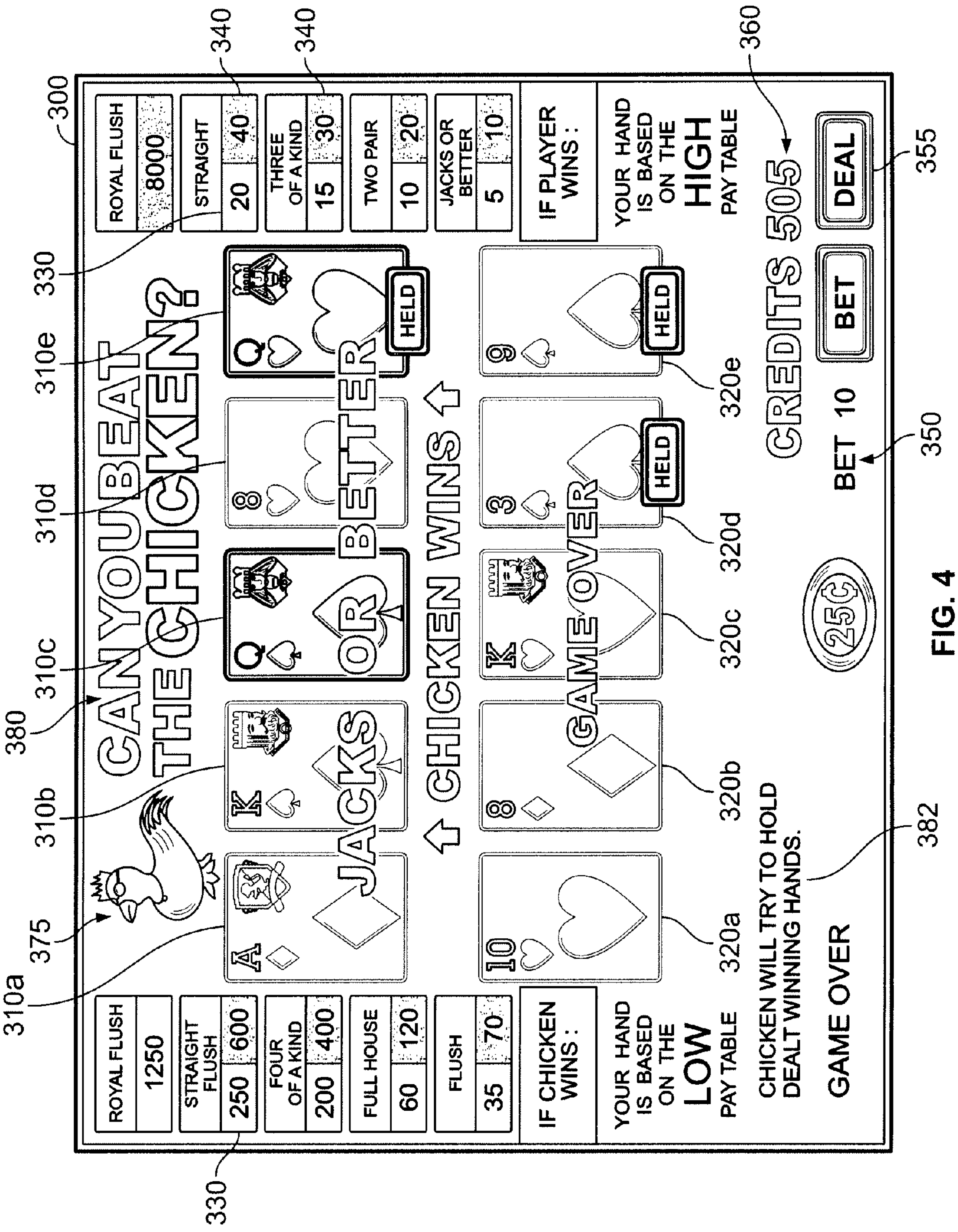
FIG. 4 shows another representative display of the wagering game shown in FIGS. 3(*a*)-3(*d*).

FIG. 4 shows an example of game play, similar to that of FIGS. 3(*a*)-(*d*), wherein the player has lost to the computer. In this example, the player again wagered 10 credits and, of the player's initially dealt hand, the player is shown to have held the three of spades (card 320*d*) and the nine of spades (card 320*e*), as indicated by a "HELD" label at the bottom of each card. Following the discard, the player was dealt a ten of hearts, an eight of diamonds, and a King of hearts. The computer's cards were then dealt and the computer is shown to have held the initially dealt Queen of hearts (card 310*e*) and discarded the remainder (cards 320*a-d*), which were then replaced by an Ace of diamonds (card 310*a*), a King of spades (card 310*b*), a Queen of spades (card 310*c*), and an eight of hearts (card 310*d*). The held Queen of hearts is indicated by a "HELD" label.

Accordingly, FIG. 4 shows that the computer's hand is a winning hand comprising a pair of Queens (cards 310*a* and 310*c*), which wins over the player's hand 320*a-e* of King high. In the illustrated example, the computer's win is highlighted by text including an overlay of the description of the winning hand ("Jacks or Better") over the cards 310*a-e*, arrows, and contrast in shading or colors, or the like.

In the example of FIGS. 3(*a*)-(*d*) and FIG. 4, in lieu of a nameless and formless computer presence, the wagering game comprises a perceptible computer opponent such as, but clearly not limited to, the illustrated chicken. Any manner of computer opponent may be utilized and there is no limitation to the form, presentation, or apparent personality, if any, to the computer opponent. This computer opponent can be advantageously utilized in accord with various aspects of the present concepts to enhance or even personalize the player's wagering game experience. The computer opponent is preferably representing graphically, such as through one or more static (e.g., stationary relative to the display) and/or dynamic (e.g., not static) images or animations, in 2-D or 3-D, and may be further accompanied by related textual messages, audio, and/or music, or the like. For example, with respect to the depicted chicken in FIGS. 3(*a*)-3(*d*) and 4, the computers election of cards to be held may be dynamically indicated by the chicken walking over the top of the cards and pecking at the cards to be held.

In one aspect, such as that depicted in the example of FIGS. 3(*a*)-3(*d*) and 4, the computer opponent is perceptible (e.g., through static image 375, textual messages 380 regarding the computer opponent, etc.), but lacks any apparent personality. In the illustrated aspect, the computer opponent adopts a fairly linear strategy and will, as indicated by message 382, try to hold dealt winning hands. Thus, if at least one implementation, the computer opponent dealt an initial hand comprising a two of hearts, a two of spades, a four of hearts, a five of hearts, and an Ace of hearts might discard all dealt cards since none of the cards present a "winning hand". Innumerable other strategies are utilizable, of course, and the computer opponent could, for the above hand, elect to hold the pair of twos (e.g., to draw to a two pair, three of a kind, etc.), hold the hearts (i.e., to draw to a flush), hold the Ace (i.e., hold the high card), or hold all but one two (i.e., discarding a two to draw to an inside straight).

The computer opponent may, alternatively, embody characteristics indicative of a personality. The computer opponent may comprise an actual artificial intelligence capable of unsupervised learning. In at least some aspects, such artificial intelligence is not utilized to the computer opponent's advantage in a manner that would adversely impact the viability of the gaming machine within the gaming jurisdiction's regulatory framework. In other words, the artificial intelligence could be constrained by the gaming jurisdictions limitations on a slot machine's theoretical payout percentage. In other aspects, the computer opponent's learned knowledge of an identified player's (e.g., via an input of a player ID, player's card, biometric input, etc.) playing style could be advantageously utilized to inform the computer opponent's non-game play interactions with the player such as, but not limited to, banter, critiques, hint, or taunt's (audio output and/or video output) directed by the computer opponent's increasing knowledge of the player and/or the player's playing style or strategy.

In yet other aspects, a plurality of computer opponents with distinctive characteristics and/or personalities, which may or may not exhibit distinctive strategies of wagering game play, may be available for selection by the player or by the controller. Continuing with the chicken computer opponent in the illustrated example of FIGS. 3(*a*)-3(*d*) and 4, various chicken computer opponents could include, but are not limited to, "a mimic chicken" that adapts its holding strategy to mimic the player's strategy, "a cheating chicken" that occasionally looks at the player's cards and adapts its holding strategy responsive to the cards held by the player in order to win (or lose, for that matter), "a careless chicken" that occasionally reveals one or more of its own cards, "a smart chicken" that knows how many cards that the player is holding and adjusts what it is holding to attempt to beat the player, "a random chicken" that holds random cards, or "a street smart chicken" that holds via a predetermined strategy. Any number of separate personalities and separate strategies may be available to the controller or the player. Likewise, different card games may employ computer opponent personalities suited for the particular game. For example, a stud game (e.g., Five-Card Stud, Six-Card Stud, Seven-Card Stud, Let it Ride, Caribbean stud poker, etc.), a community card-based game (e.g., Texas Hold 'Em, etc.), or Blackjack, wherein one or more cards are hidden from the player during the wagering game, may utilize a "bluffing chicken" that engages in one or more of a pure bluff or semi-bluff prior to, or subsequent to, a player's selection of cards to hold and the controller may permit the player an opportunity to change his or her hold, if desired, responsive to the bluff.

In still other aspects, one or more computer opponents may exhibit a game strategy that is directly influenced by the player. For example, "a nervous chicken," whose strategy is compromised with increasing wagers, perhaps owing to the high pressure of the increased stakes. This "nervous chicken" makes more strategic deviations, or mistakes, from a predetermined base strategy, which could be a conservative strategy or an aggressive strategy. For example, the "nervous chicken's" implementation of its base strategy, statistically at least, will be better at a wager of 2 credits than is its strategy at a wager of 6 credits. The "nervous chicken's" strategic deviations or mistakes may not be immediately apparent to the player, but would no doubt be noticed by an astute player after play of a statistically significant number of hands or noticed if the import of the deviation or error was facially apparent (e.g., forgetting to hold a pair of Aces, etc.).

The above-noted banter, critiques, hints, or taunts directed to the player by the computer opponent may likewise be influenced by the computer opponents' distinctive personality. For example, the audio output and/or video output may include relatively cocky or aggressive taunts from the "street smart chicken" (e.g., "So we meet again!," "Ready for More Are Ya!"), regardless of the player's history with that particular computer opponent, whereas a "smart chicken" may issue more knowing and tempered comments (e.g., "You may have won last time, but this time I am ready for you!") regarding the player's history with that particular computer opponent. Thus, the player's history with one (or more) computer opponent(s) may optionally be stored in association with the player, such as storing the state of the one (or more) computer opponent(s) at the time of termination of play in association with a player's Players Club Account, a player's stored biometric characteristics, a player ID number, or the like.

Although a "Jacks or Better" five-card draw poker game is depicted in the example of FIGS. 3(*a*)-(*d*) and FIG. 4, other types of draw poker games may alternatively be employed in association with the disclosed concepts such as, but not limited to, "Tens or Better," "Deuces Wild," "Bonus Poker," "Double Bonus," "Double Double Bonus". The present concepts may also optionally be implemented in a card-based wagering game comprising one or more progressive pools. Further, additional poker variants may alternatively be employed in association with the disclosed concepts including, but not limited to, stud poker games or poker games comprising at least one community card. Stud poker games comprise variants in which each player receives a mix of face-down and face-up cards dealt in multiple betting rounds such as, but not limited to, five-card stud or seven-card stud. Poker games comprising at least one community card comprise, but are not limited to, Texas Hold 'Em.

FIGS. 3(*a*)-(*d*) and FIG. 4 illustrate one example of a video poker game in accord with at least some aspects of the present concepts wherein a player is awarded a first payout according to a pay table if they lose to a computer opponent, the chicken, and a second payout, higher than the first payout, if they beat the computer opponent. Although the second payout is shown as a separate pay table, the enhanced payout in accord with the present concepts may comprise any enhancement of the first payout. For example, where the first payout is a standard pay table for a given wagering game, the second payout may comprise a multiplier, greater than ×1.0, to the first payout. As another example, the first payout is a standard pay table for a given wagering game and the second payout comprises a predetermined credit amount added to the first payout, such payout preferably, but not necessarily, increasing in correspondence with the increasing value of the payouts in the pay schedule (i.e., the player would receive a higher added credit amount for a Straight Flush than for a Jacks or Better). The present concepts may advantageously utilize any conventional approach to enhance the player's award for a winning hand that beats the computer's hand. The converse is also firmly within the present concepts. In other words, a player is awarded a first payout according to a pay table if they beat a computer opponent, the chicken, and a second payout, lower than the first payout, if they lose the computer opponent. Here, the first payout or basic award is for a player's winning hand that is superior (in the pay table hierarchy) to any hand of the computer opponent and the second payout, for a player's winning hand that is inferior (in the pay table hierarchy) to a winning hand of the computer opponent, comprises a multiplier, less than ×1.0, or a credit amount subtracted from the first payout.

Further, the present concepts are not limited to poker type games and may be used in combination with other types of wagering games employing strategic decision-making on the part of the player such as, but not limited to, Pai Gow poker, "Blackjack," or Baccarat.

In an alternate game in accord with other aspects of the present concepts, the player would get their own customizable chicken as an avatar, or other selected avatar persona, such as may be available to a player in accord with a particular wagering game theme. The player would work to "train" his or her avatar to play the wagering game like the player. The player would then be able to enter his or her trained avatar into tournament or other competition against one or more computer opponents, one or more other avatars, or one or more other players. Thus, the player could enter his or her avatar into tournament events, such as the "World Series of Chicken Poker," where players pit their trained chicken avatars in a tournament event against each other. Similarly, the player could opt to use their avatar to play hands for the player in a normal wagering game context, perhaps if the player is overly tired and unable to accurately and consistently implement his or her desired strategy or if the player wants to take a break.

The player's avatar also provides interesting game play opportunities for auto play or unassisted play. The player may desire to take a break to have dinner and may set up the avatar to continue playing the wagering game on the player's behalf in the player's absence. The avatar would then proceed to continue to play the wagering game on the player's behalf, using the player's wagering account, subject to any optional constraints that the player may elect to implement. Such constraints could include, but are not limited to, time constraints, loss limits, a winning threshold, a loss rate, or the like. The controller may further be optionally configured to automatically or upon a player's request, transmit continuous, periodic, or target based updates of the player's avatar's wagering game play performance to a player's portable electronic device (e.g., a cell phone, PDA, etc.). The player may advantageously be permitted to remotely control the avatar's wagering game play, such by adjusting, cancelling, or implementing additional constraints at any time.

Preferably, the player's avatar is a persistent-state object that permits a player to terminate wagering game play involving the avatar at any desired point and subsequently resume wagering game play involving the avatar at the point at which the player previously left the avatar.

In a simplistic aspect, the player could simply select a base strategy to be employed by the avatar from a plurality of available strategies. In another aspect, the player is prompted to select from a plurality of available strategies a base strategy that most closely approximates the player's playing style, to then be used as a template for the avatar's strategy. The controller would then implement conventionally known (or later developed) machine learning algorithms, predictive analytics, or statistical analysis to determine deviations of the player's implementation of his or her professed strategy from the base strategy selected for the avatar, to characterize or model such deviations, and optionally to compare such model to future wagering game by the player to determine if the model is predictive of the player's strategy. The avatar's strategy may be automatically (e.g., substantially continuously or periodically) modified to reflect the characterized or modeled deviations, or may be modified periodically following a prompt to the player to accept or decline the modification.

In another aspect, the player may "train" the avatar, in a more literal sense, by taking the avatar "offline" in the wagering game to one or more training classes or exercises wherein the avatar learns how to play the wagering game, such as a poker-based game. Although it would be presently preferred to have the avatar learn from the player through actual wagering game play, optionally including wagering patterns, it is also possible that the player may be permitted to personally train the avatar in a training environment at no cost to the player, or the player may be permitted to pay an "instructor" to train the avatar. In another aspect, the player pays nothing for the avatar's training, but the player must actively participate in the avatar's training and is subjected to various forms of advertising funded by third parties. In still another aspect, the training classes or exercises are, in effect, a bonus feature associated with the occurrence of a predetermined random event or occurrence of any one of a plurality of predetermined random events in a base wagering game. The random event may comprise, for example, a hand of a predetermined minimum rank in the pay table hierarchy (e.g., a Four of a Kind) or the occurrence of a special card in a 53-card deck (e.g., using a chicken card in lieu of a Joker) in a certain position, as part a predetermined combination of cards, or as part of a hand having a predetermined minimum rank in the pay table hierarchy (e.g., a Straight Flush).

The avatar's training and/or ascent to a higher level rank may be graphically represented in any manner such as, but not limited to, a video clip, animation, or series of still images. The graphical representation of the training to the player may be passive, requiring no player input during graphical representation, or active, requiring some player input during the graphical representation. The graphical representation of the training may include, for example, video or animation of the avatar sitting in a classroom environment, taking exams, receiving grades, and/or competing head-to-head in the training environment against the computer-generated instructors or other computer-generated players or students (e.g., in a training academy). The rank of the player's avatar is thus enabled to increase over time, honing and improving the avatar's strategy over time and ability of the player's avatar to prevail over computer and non-computer opponents. Where the avatar's training is cued to predetermined minimum ranks in the pay table hierarchy, the avatar's skill level will, statistically speaking, roughly track the probability of the triggering event and the player's actual level of play.

As noted above, a player can use a telephone, PDA, computer, or the like, to access and use one or more of the player's accumulated game assets. For example, using a mobile phone, the player can dial a toll-free phone number to access his or her game assets. A central server associated with the network 50 (FIG. 2) can recognize the player's mobile number for identification purposes, via a caller-id feature, or, alternatively, the central server may require the player to create a unique code number (if, for example, the player uses a caller-id block feature). Optionally, the player may be required to enter an additional code for identifying a specific gaming machine 10.

Thus, the player can use his or her mobile phone to remotely access the wagering game and utilize the accumulated assets at a time and place according to the player's desire. For example, the player can restart a gaming session via the mobile phone at a point where he or she had previously stopped the session, or the player can choose, via the mobile phone, to play an accumulated bonus game that he or she had previously won, but not played.

In another example, the player can put money into a gaming machine 10 while the player is physically at the gaming machine 10. Before the player walks away from the gaming machine 10, the player can register the gaming machine 10 to the player's phone. The player can also let the gaming machine 10 know what assets it may intend to use in the future via remote access by the phone. For example, the player can register the phone number as a password required to access the player's assets on the gaming machine 10. The player can initiate an auto-play feature while at the gaming machine 10 or remotely via the phone. The auto-play feature of the gaming machine 10 is configured to report, e.g., via still or moving images on the phone, one or more of the gaming outcomes. Then, at a later time, the player returns to the gaming machine 10, re-checks into the gaming machine via the phone and, optionally, cashes out any winnings. While no actual gameplay occurs on the phone, the phone is used for accessing the player's assets and gaming outcomes on the gaming machine 10.

Optionally, the wagering game provides the player with access to accumulated assets and/or certain awards only if the player achieves a "Remote Play Winning Outcome." If the player achieves this outcome (e.g., in a basic or bonus game), then he or she is allowed remote access to one or more of the accumulated assets and/or certain awards. For example, if the player achieves the "Remote Play Winning Outcome," the player can have the option to select a smaller award while the player is physically present at the gaming machine 10 or a larger award if the player uses the telephone. In another example, the player may be given the option to play for smaller awards while the player is physically present at the gaming machine 10 or for larger awards if the player uses the telephone for gameplay initiation.

Alternative to using a voice telephone call to initiate a game or to access assets and/or awards, as described above, the player can send a text message. For example, the player can send a special code in the text message to log-in using a special number on the gaming machine 10.

For identification purposes, various verification ways can be used. For example, the player can enter the mobile telephone number into the gaming machine 10 as a player identification number. When the phone is near, the gaming machine 10 can detect it and verify the player identification number, e.g., the mobile number. For example, a receiver can be installed in the gaming machine 10 for detecting a mobile identifier (which may include the mobile number) that is periodically transmitted by mobile phones to the nearest mobile base station. Thus, the gaming machine 10 would have similar capabilities to the mobile base station.

Alternatively, the gaming machine 10 can send a voice or text message to the mobile telephone to verify the player's identification number. For example, the gaming machine 10 can send a text message asking the player to reply to the text message using a predetermined code for confirmation purposes. Optionally, a Bluetooth identifier can be used for logging-in and/or verification purposes, wherein the Bluetooth identifier is unique per phone and/or service carrier.

Special benefits can be offered to a player based on the telephone brand and/or service carrier. For example, predetermined assets can be made available to the player only if they use a telephone of brand X that uses service carrier Y.

Each of these aspects and embodiments, and obvious variations thereof, are contemplated as falling within the spirit and scope of the present disclosure and, at least some aspects of which are set forth in the following claims.

What is claimed is:

1. A computer-implemented method of conducting wagering games on a wagering game system, the wagering game system including one or more input devices, one or more display devices, and one or more processors, the method comprising:

receiving, via at least one of the one or more input devices, an input from a player indicative of a wager to play a poker game, the poker game including first and second pay tables, each pay table including a hierarchy of poker hand ranks and respective payouts;

receiving, via at least one of the one or more input devices, an input from the player to select a single computer opponent from a plurality of player-selectable computer opponents having respective different playing strategies;

displaying, on at least one of the one or more display devices, a poker hand of the player and a poker hand of the selected computer opponent;

modifying, by a controller, the poker hand of the selected computer opponent in accordance with the selected computer opponent's playing strategy; and in response to the player's poker hand being among the hierarchy of poker hands, awarding, by the controller, the associated payout from the first pay table if the player's poker hand has a lesser rank than the computer opponent's poker hand and awarding the associated payout from the second pay table if the player's poker hand has a greater rank than the computer opponent's poker hand, the payout from the second pay table being greater than the payout from the first pay table.

2. The computer-implemented method of claim 1, wherein the playing strategy of the selected computer opponent is adjusted responsive to the player's wager or a wagering history of the player.

3. The computer-implemented method of claim 2, wherein an increase in the size of the wager is associated with an increased rate of strategic deviations by the selected computer opponent from the selected computer opponent's playing strategy.

4. The computer-implemented method of claim 3, wherein the strategic deviations are indicative of mistakes made by the selected computer opponent.

5. The computer-implemented method of claim 1, wherein the playing strategy of the selected computer opponent is adjusted responsive to a playing strategy of the player.

6. The computer-implemented method of claim 1, wherein a player's history with at least one selected computer opponent is stored and later recalled at a subsequent gaming session of the player.

7. The computer-implemented method of claim 1, wherein the poker game is a five-card draw poker game.

8. The computer-implemented method of claim 1, wherein the poker game includes at least one community card.

9. The computer-implemented method of claim 1, further comprising displaying, on at least one of the one or more display devices, the playing strategy of the selected computer opponent.

10. A gaming system configured to conduct a wagering game comprising:

one or more input devices;

one or more display devices;

one or more processors;

one or more memory devices storing instructions that, when executed by the at least one of the one or more processors, cause the gaming system to:

receive an input, via at least one of the one or more input devices, from a player indicative of a wager to play a poker game, the poker game including first and second pay tables, each pay table including a hierarchy of poker hand ranks and respective payouts;

receive an input, via at least one of the one or more input devices, from the player to select a single computer opponent from a plurality of player-selectable computer opponents having respective different playing strategies;

display, on at least one of the one or more display devices, a poker hand of the player and a poker hand of the selected computer opponent;

modify, by a controller, the poker hand of the selected computer opponent in accordance with the selected computer opponent's playing strategy;

in response to the player's poker hand being among the hierarchy of poker hands, award, by the controller, the associated payout from the first pay table if the player's poker hand has a lesser rank than the computer opponent's poker hand and awarding the associated payout from the second pay table if the player's poker hand has a greater rank than the computer opponent's poker hand, the payout from the second pay table being greater than the payout from the first pay table.

11. The gaming system of claim 10, wherein the playing strategy of the selected computer opponent is adjusted responsive to the player's wager or a wagering history of the player.

12. The gaming system of claim 11, wherein an increase in the size of the player's wager is associated with an increased rate of strategic deviations by the selected computer opponent from the computer opponent's playing strategy.

13. The gaming system of claim 12, wherein the strategic deviations are indicative of mistakes made by the selected computer opponent.

14. The gaming system of claim 10, wherein the playing strategy of the selected computer opponent is adjusted responsive to a playing strategy of the player.

15. The gaming system of claim 10, wherein a player's history with at least one selected computer opponent is stored and later recalled at a subsequent gaming session of the player.

16. The gaming system of claim 10, wherein the poker game is a five-card draw poker game.

17. The gaming system of claim 10, wherein the poker game includes at least one community card.

18. The gaming system of claim 10, further comprising wherein the instructions cause the gaming system to display, on at least one of the one or more display devices, the playing strategy of the selected computer opponent.

19. A computer-implemented method of conducting wagering games on a wagering game system, the wagering game system including one or more input devices, one or more display devices, and one or more processors, the method comprising:

receiving, via at least one of the one or more input devices, an input from a player to place a wager to play a poker game, the poker game including first and second pay tables, each pay table including a hierarchy of poker hand ranks and respective payouts;

receiving, via at least one of the one or more input devices, an input from the player to select a single computer opponent from a plurality of player-selectable computer opponents having respective different playing strategies;

displaying, on at least one of the one or more display devices, a poker hand of the player and a poker hand of the selected computer opponent;

receiving, via at least one of the one or more input devices, an input from the player to alter the poker hand of the player;

altering, by a controller, the poker hand of the selected computer opponent in accordance with the selected computer opponent's playing strategy; and in response to the player's poker hand being among the hierarchy of poker hands, awarding, by the controller, the associated payout from the first pay table if the player's poker hand has a lesser rank than the computer opponent's poker hand and awarding the associated payout from the second pay table if the player's poker hand has a greater rank than the computer opponent's poker hand, the payout from the second pay table being greater than the payout from the first pay table.

20. The computer-implemented method of claim 19, wherein a player's history with at least one selected computer opponent is stored and later recalled at a subsequent gaming session of the player, and wherein the poker game is a five-card draw poker game.

* * * * *